(12) United States Patent (10) Patent No.: US 9,223,122 B2
Inoko (45) Date of Patent: Dec. 29, 2015

(54) ILLUMINATION OPTICAL SYSTEM AND IMAGE PROJECTION APPARATUS

(71) Applicant: CANON KABUSHIKI KAISHA, Tokyo (JP)

(72) Inventor: Kazuhiro Inoko, Utsunomiya (JP)

(73) Assignee: CANON KABUSHIKI KAISHA (JP)

(*) Notice: Subject to any disclaimer, the term of this patent is extended or adjusted under 35 U.S.C. 154(b) by 183 days.

(21) Appl. No.: 13/765,724

(22) Filed: Feb. 13, 2013

(65) Prior Publication Data

US 2013/0215401 A1 Aug. 22, 2013

(30) Foreign Application Priority Data

Feb. 13, 2012 (JP) ................................. 2012-028507

(51) Int. Cl.
*G03B 21/20* (2006.01)
*F21V 5/00* (2015.01)
(Continued)

(52) U.S. Cl.
CPC ............... *G02B 19/0047* (2013.01); *F21V 5/04* (2013.01); *F21V 9/14* (2013.01); *F21V 13/04* (2013.01); *G02B 27/0905* (2013.01); *G02B 27/0961* (2013.01); *G02B 27/285* (2013.01); *G03B 21/14* (2013.01); *G03B 21/208* (2013.01); *G03B 21/2026* (2013.01); *G03B 21/2013* (2013.01)

(58) Field of Classification Search
CPC .... G03B 21/208; G03B 21/206; F21V 13/04; F21V 5/004; F21V 5/007; F21V 5/008; G02B 3/0056; G02B 27/0905; H04N 9/315; H04N 9/3152

USPC ........................................................ 353/38, 20
See application file for complete search history.

(56) References Cited

U.S. PATENT DOCUMENTS 5,418,583 A * 5/1995 Masumoto ...................... 353/38
7,177,078 B2 2/2007 Yamada et al.
(Continued)

FOREIGN PATENT DOCUMENTS

CN 1721978 A 1/2006
CN 100514120 C 7/2009
(Continued)

OTHER PUBLICATIONS

Taiwanese Office Action cited in Taiwanese application No. TW102105382, dated Jul. 24, 2014. English translation provided.
(Continued)

*Primary Examiner* — William C Dowling
*Assistant Examiner* — Ryan Howard
(74) *Attorney, Agent, or Firm* — Rossi, Kimms & McDowell LLP

(57) ABSTRACT

The illumination optical system includes, as optical elements, a condenser lens system (3) to condense light from a light source (1), a first fly-eye lens (5) and a second fly-eye lens (6). The light source generates a light emitter having a finite longitudinal length in a first direction orthogonal to an optical axis direction of the illumination optical system. The light source and the optical elements are configured to form the light source images closer to the illumination surface than the second fly-eye lens. The light source and the optical elements are configured to satisfy a condition of $P2/P1 \leq 2.0$. In the condition, P1 represents an array pitch of the light source images in the first direction, and P2 represents an array pitch of the light source images in a second direction orthogonal to the first and optical axis directions.

8 Claims, 15 Drawing Sheets

(51) Int. Cl.
*G02B 19/00* (2006.01)
*F21V 5/04* (2006.01)
*F21V 13/04* (2006.01)
*F21V 9/14* (2006.01)
*G03B 21/14* (2006.01)
*G02B 27/09* (2006.01)
*G02B 27/28* (2006.01)

(56) References Cited

U.S. PATENT DOCUMENTS

| | | | |
|---|---|---|---|
| 7,807,957 B2 | 10/2010 | Kimura | |
| 7,878,659 B2 | 2/2011 | Kadowaki et al. | |
| 8,094,290 B2 | 1/2012 | Owa et al. | |
| 8,562,140 B2 | 10/2013 | Inoko | |
| 2003/0234983 A1 | 12/2003 | Baba | |
| 2006/0001838 A1 | 1/2006 | Yoshii et al. | |
| 2011/0027724 A1 | 2/2011 | Tanaka | |
| 2012/0133900 A1* | 5/2012 | Miura | 353/31 |

FOREIGN PATENT DOCUMENTS

| | | |
|---|---|---|
| CN | 101634800 A | 1/2010 |
| JP | 07135148 A | 5/1995 |
| JP | 2003-186111 A | 7/2003 |
| JP | 2007121602 A | 5/2007 |
| JP | 2007212735 A | 8/2007 |
| JP | 2007309963 A | 11/2007 |
| JP | 2009008728 A | 1/2009 |
| JP | 2009175308 A | 8/2009 |
| TW | 200702884 A | 1/2007 |
| TW | 200938959 A | 9/2009 |
| TW | 200949459 A1 | 12/2009 |

OTHER PUBLICATIONS

Chinese Office Action cited in Chinese counterpart application No. CN201310048969.1, dated Nov. 27, 2014.
Korean Office Action issued in Korean counterpart application No. KR10-2013-0013225, dated Jan. 30, 2015.
Office Action issued in JP2012-028507, mailed Nov. 10, 2015.

* cited by examiner

PRIOR ART

ILLUMINATION OPTICAL SYSTEM AND IMAGE PROJECTION APPARATUS

BACKGROUND OF THE INVENTION

1. Field of the Invention

The present invention relates to an illumination optical system that is used for image projection apparatuses such as liquid crystal projectors.

2. Description of the Related Art

Image projection apparatuses have an illumination optical system to introduce light emitted from a light source to an image forming element such as a liquid crystal panel so as to illuminate the image forming element with the light, and have a projection optical system to project the light that is enlarged and to which image information is added by the image forming element onto a projection surface such as a screen.

Many of such image projection apparatuses use as the light source a discharge arc tube such as a high-pressure mercury lamp or a metal halide lamp. The discharge arc tube that a high voltage is applied between its paired discharge electrodes away from and facing each other generates an arc therebetween to emit light therefrom.

On the other hand, many of the illumination optical systems use, in order to evenly illuminate the image forming element with the light from the light source, as disclosed in Japanese Patent Laid-Open No. 2003-186111, a fly-eye lens array constituted by a plurality of lens cells two-dimensionally arrayed.

FIG. 16 shows the illumination optical system including such a fly-eye lens array (hereinafter simply referred to as "a fly-eye lens"), which is disclosed in Japanese Patent Laid-Open No. 2003-186111. Light from a light source 21 constituted by a discharge arc tube and a reflector is divided into a plurality of light fluxes by a plurality of lens cells of a first fly-eye lens 22, and the divided light fluxes are condensed by the lens cells to form arc images as light source images near a second fly-eye lens 23. A polarization conversion element 25 is disposed immediately behind the second fly-eye lens 23.

The polarization conversion element 25 is produced by arraying, with a constant pitch, a plurality of polarization beam splitters each having a width (height) corresponding to ½ of an array pitch of the lens cells constituting the second fly-eye lens 23 and by disposing half-wave plates on alternate ones of entrance surfaces of the polarization beam splitters. The light emitted from the light source 21 which is non-polarized light is converted by a polarization conversion effect of the polarization conversion element 25 into linearly-polarized light having a polarization direction in a specific direction. However, of the light emitted from the light source 21, only partial light entering the polarization conversion element 25 through its effective entrance areas receives the polarization conversion effect.

As shown as hatched areas in FIG. 17 showing the polarization conversion element 25 viewed from a light source side, light blocking members 24 are disposed in non-effective entrance areas of the polarization conversion element 25. Light not entering the polarization conversion element 25 through its effective entrance areas by being blocked by the light blocking members 24 becomes loss light. On the other hand, light forming part of the arc image AI and not entering the lens cell of the second fly-eye lens 23 provided in a one-to-one relation with the lens cell of the first fly-eye lens 22 also becomes loss light.

That is, of the light passing through the first fly-eye lens 22 and forming the arc image AI, light other than light entering the polarization conversion element 25 through the effective entrance areas and further entering the lens cells of the second fly-eye lens 23 becomes loss light, which deteriorates utilization efficiency of the light from the light source.

In the illumination optical system disclosed in Japanese Patent Laid-Open No. 2003-186111, the light source 21 is constituted by the discharge arc tube whose arc direction (direction in which the discharge electrodes are arranged) is set parallel to an optical axis of the illumination optical system and the reflector having a paraboloidal shape rotationally symmetric about the optical axis as an axis of symmetry.

In such a configuration, the arc images AI are formed radially about the optical axis as shown in FIG. 17 and have mutually different orientations. In this case, it is difficult to effectively cause all the light forming the arc images AI to enter the polarization conversion element 25 through the effective entrance areas and further enter the lens cells of the second fly-eye lens 23.

Moreover, discharge arc tubes such as high-pressure mercury lamps have a characteristic that tips of the discharge electrodes are worn out with increase of an accumulated light emission time and a length of the arc is thereby increased. The increase of the arc length increases sizes of the arc images, which decreases the light entering the polarization conversion element 25 through the effective entrance areas and further entering the lens cells of the second fly-eye lens 23. Thereby, the utilization efficiency of the light from the light source is significantly deteriorated. Thus, the conventional illumination optical system using the discharge arc tube is sensitive to the increase of the arc length, and its luminance is likely to be decreased. In other words, the wear of the discharge electrodes directly causes the deterioration of the utilization efficiency of the light from the light source.

SUMMARY OF THE INVENTION

The present invention provides an illumination optical system capable of maintaining a high utilization efficiency of light from a light source regardless of increase of an accumulation light emission time and provides an image projection apparatus using the illumination optical system.

The present invention provides as one aspect thereof an illumination optical system including, as optical elements, a condenser lens system configured to condense light emitted from a light source, a first fly-eye lens configured to divide the light from the condenser lens system into a plurality of light fluxes, and to cause the light fluxes to form light source images two-dimensionally arrayed, and a second fly-eye lens configured to transmit the light fluxes from the first fly-eye lens toward an illumination surface to be illuminated. The light source generates a light emitter having a finite longitudinal length in a first direction orthogonal to an optical axis direction of the illumination optical system. The light source and the optical elements are configured to form the light source images closer to the illumination surface than the second fly-eye lens, and to satisfy the following condition:

$$P2/P1 \leq 2.0$$

where P1 represents an array pitch of the light source images in the first direction, and P2 represents an array pitch of the light source images in a second direction orthogonal to the first and optical axis directions.

The present invention provides as another aspect thereof an image projection apparatus including the above illumination optical system, an image forming element disposed at a position of the illumination surface, and a projection optical system configured to project the light from the image forming element to a projection surface.

Further features and aspects of the present invention will become apparent from the following description of exemplary embodiments with reference to the attached drawings.

DESCRIPTION OF THE PREFERRED EMBODIMENTS

Embodiments of the present invention will hereinafter be described with reference to the accompanying drawings.

[Embodiment 1]

Figure 1A:
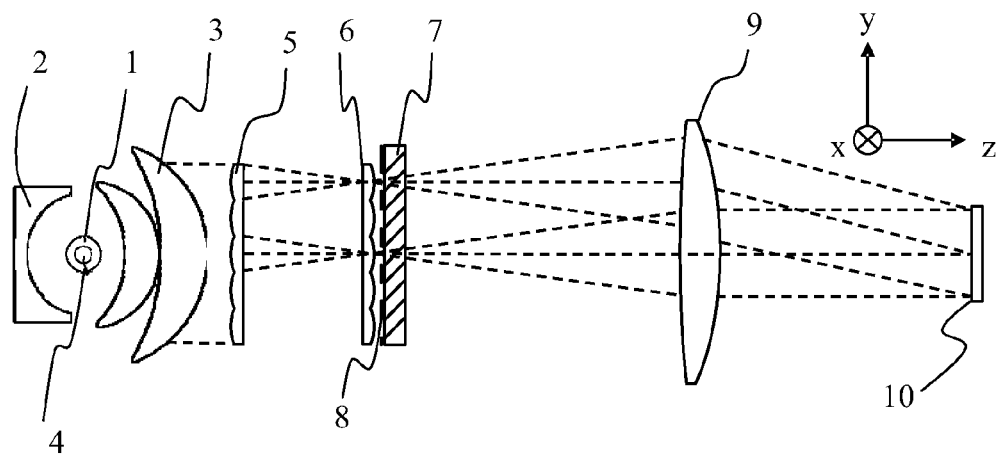
FIGS. 1A and 1B are respectively a y-z sectional view and an x-z sectional view showing a configuration of an illumination optical system that is Embodiment 1 of the present invention.
Figure 1B:
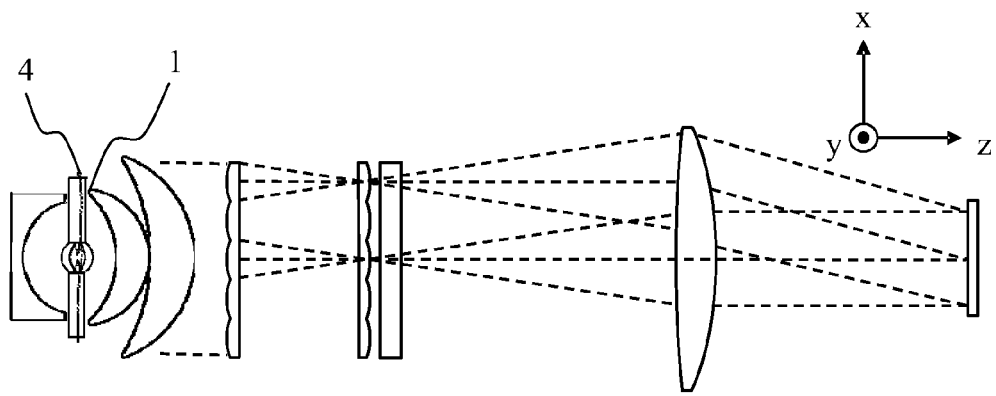

FIGS. 1A and 1B show an optical configuration of an illumination optical system that is a first embodiment (Embodiment 1) of the present invention. This embodiment (and other embodiments described later) defines a direction in which light from a light source travels in the illumination optical system as a z direction corresponding to an optical axis direction, and defines directions orthogonal to the z direction and orthogonal to each other as an x direction and a y direction. FIG. 1A is a y-z sectional view of the illumination optical system, and FIG. 1B is an x-z sectional view thereof.

Reference numeral 1 denotes a high-pressure mercury lamp. The high-pressure mercury lamp 1 is a discharge arc tube, which generates an arc as a light emitter between paired discharge electrodes to which a high voltage is applied in gas enclosed in a glass tube and emits light from the arc. In this embodiment, the paired discharge electrodes are disposed so as to face each other with a distance therebetween in the x direction as a first direction across the y-z section, and the arc is formed along the x direction. That is, the lamp 1 generates an arc having a finite longitudinal length in the x direction orthogonal to the optical axis direction of the illumination optical system. A direction in which the paired discharge electrodes are arranged so as to face each other is hereinafter referred to as "an arc direction".

Of the light emitted from the lamp 1, light traveling toward the illumination optical system (in a +z direction) is condensed and collimated by a condenser lens system 3 constituting part of the illumination optical system, and then enters a first fly-eye lens 5. A light acceptance angle θ of the condenser lens system 3 from the lamp 1 is larger than 80 degrees.

On the other hand, of the light emitted from the lamp 1, light traveling in an opposite direction to the illumination optical system, that is, to the condenser lens system 3 (in a −z direction) is reflected by a retroreflective mirror 2 disposed on a side opposite to the condenser lens system 3 across the lamp 1. The retroreflective mirror 2 has a so-called toric shape whose x-z and y-z sectional shapes are different from each other so as to cancel out aberration generated due to a glass tube shape of the lamp 1, which returns the light from the lamp 1 (that is, from the arc) back to a position of the arc with almost no aberration. The light returned back to the position of the arc and then traveling in the +z direction passes through the condenser lens system 3 to enter the first fly-eye lens 5 as described above. The lamp 1 and the retroreflective mirror 2 constitute a light source. An anti-reflection film may be provided on at least a retroreflective mirror side portion of the glass tube of the lamp 1.

In the y-z section, the light is emitted radially in 360 degree circumferential directions from the lamp 1, and however a gap is formed between the retroreflective mirror 2 and the condenser lens system 3. Therefore, in this embodiment orientation of the lamp 1 is decided such that a trigger line 4 of the lamp 1 is located in the gap as shown in FIG. 1B. The trigger line 4 is a conductive line to apply a voltage necessary to cause the lamp 1 to generate the arc (that is, to activate the lamp 1) and does not transmit light, which causes loss of light. This embodiment minimizes the loss of light by disposing such a trigger line 4 at a boundary between the retroreflective mirror 2 and the condenser lens system 3.

The first fly-eye lens 5 is constituted by a plurality of lens cells two-dimensionally arrayed and each having a rectangular shape similar to that of an image forming element 10 whose image forming surface is disposed at a position of a surface to be illuminated (hereinafter referred to as "an illumination surface"). The light entering the first fly-eye lens 5 is divided by the lens cells into a plurality of light fluxes, and each of the divided light fluxes is condensed by each of the lens cells of the first fly-eye lens 5. Each lens cell of the first fly-eye lens 5 is configured such that its focal point is located near a corresponding lens cell of a second fly-eye lens 6 and closer to the illumination surface than the second fly-eye lens 6. Thus, the divided light fluxes exiting from the first fly-eye lens 5 form arc images (light source images), each being an image of the light emitter, near the second fly-eye lens 6 and closer to the illumination surface than the second fly-eye lens 6.

The second fly-eye lens 6 is constituted by a plurality of lens cells two-dimensionally arrayed and each corresponding to each lens cell of the first fly-eye lens 5 in one-to-one relation. Each lens cell of the second fly-eye lens 6 is configured such that its object-side focal point is located at the corresponding lens cell of the first fly-eye lens 5. The lens cells of the second fly-eye lens 6 and a condenser lens 9 disposed closer to the illumination surface than the second fly-eye lens 6 (hereinafter referred to as "behind the second fly-eye lens 6") constitute a tandem system. The tandem system forms images of the lens cells of the first fly-eye lens 5 with a lateral magnification corresponding to a ratio of focal lengths of each lens cell of the second fly-eye lens 6 and the condenser lens 9 such that the lens cell images overlap each other on the image forming element 10 disposed at the illumination surface. Thereby, the entire image forming surface of the image forming element 10 is evenly illuminated.

A polarization conversion element 7 is disposed immediately behind the second fly-eye lens 6. The polarization conversion element 7 is constituted by a plurality of polarization beam splitters each extending in the x direction with a width (height) corresponding to half of an array pitch in the y direction (second direction) of the lens cells of the second fly-eye lens 6 and arrayed in the y direction. The polarization conversion element 7 converts the light from the light source which is non-polarized light into linearly-polarized light having a polarization direction in one specific direction. On a light entrance side of the polarization conversion element 7, light blocking members 8 having a same width (height) as that of each polarization beam splitter are disposed so as to block the light from entering alternate ones of the polarization beam splitters.

Each polarization beam splitter has an optical path dividing function of dividing light entering thereinto into a transmitted light and a reflected light according to their polarization directions. The polarization direction of one of the transmitted and reflected lights is rotated by a half-wave plate (not shown) provided behind the polarization beam splitter. Thereby, the polarization directions of all the light entering the polarization conversion element 7 are converted into the one specific direction.

Figure 2A:
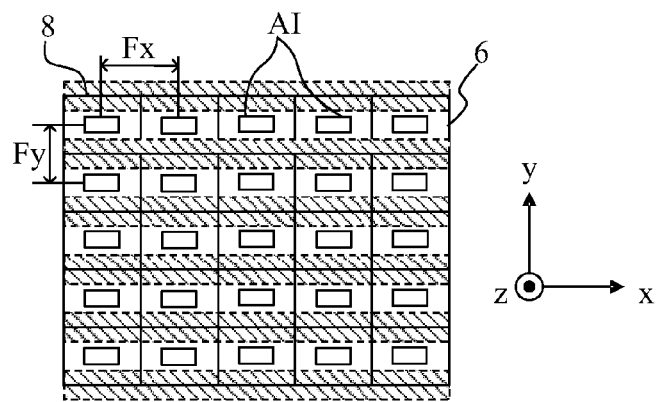
FIGS. 2A and 2B respectively show arc images formed near a second fly-eye lens and arc images formed behind a polarization conversion element in the illumination optical system of Embodiment 1.
Figure 2B:
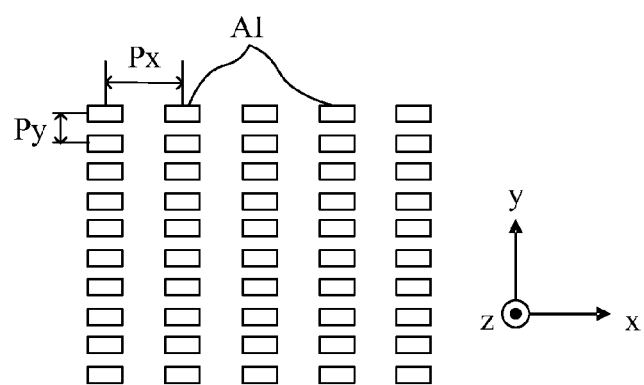

FIG. 2A shows an arrangement relationship of the lens cells of the second fly-eye lens 6 and the light blocking members 8 of the polarization conversion element 7, and shows the arc images AI formed near the second fly-eye lens 6 and viewed from an illumination surface side. FIG. 2B shows the arc images AI formed after exiting from the polarization conversion element (that is, behind the polarization conversion element 7), number of the arc images AI in the y direction being increased by the optical path dividing function of the polarization beam splitters. These descriptions for FIGS. 2A and 2B also apply to FIGS. 5A and 5B, FIGS. 7A and 7B, FIGS. 9A and 9B and FIGS. 11A and 11B used in the other embodiments described later.

The image forming element 10 has an aspect ratio of 4:3, and is disposed such that its long side extends in the x direction. The first and second fly-eye lenses 5 and 6 are not decentered with respect to each other, and the lens cell of the second fly-eye lens 6 has a same shape as that of the lens cell of the first fly-eye lens 5. The first and second fly-eye lenses 5 and 6 have a 4:3 ratio of lens cell array pitches in the x and y directions.

Each of the light blocking member 8 has a width (height) corresponding to half of the lens cell array pitch in the y direction of the second fly-eye lens 6, and is disposed so as to face an area of an exit surface of the second fly-eye lens 6 which crosses a boundary of the lens cells adjacent to each other in the y direction. Therefore, only light passing through, of the lens cell of the second fly-eye lens 6, an area not facing the light blocking member 8, that is, an area having a width corresponding to the half of the lens cell array pitch in the y direction enters the polarization conversion element 7. In an entrance surface of the polarization conversion element 7, an area not covered by the light blocking member 8, that is, an effective entrance area has a rectangular shape whose ratio of lengths in the x and y directions is 4:1.5

As shown in FIGS. 2A and 2B, all the arc images AI formed in this embodiment have a longitudinal direction (hereinafter this direction is referred to as "the arc direction", too) in the x direction, which is significantly different from cases where conventional paraboloidal reflectors are used for the lamp light source. This difference of this embodiment is provided by disposing the lamp 1 such that its arc direction is orthogonal to the optical axis direction and by condensing the light toward the first fly-eye lens 5, not by using a reflector having a rotationally symmetric shape about the optical axis, but by using the condenser lens system 3.

Figure 17:
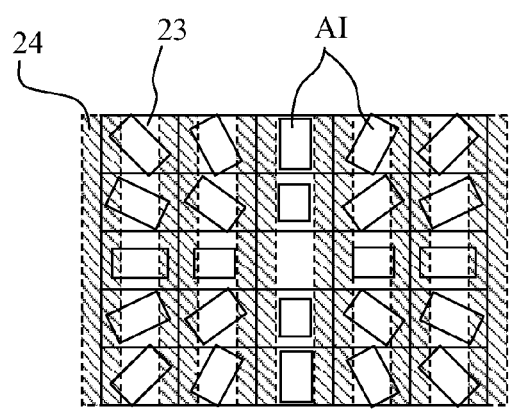
FIG. 17 shows arc images formed near a second fly-eye lens in the conventional illumination optical system.

This embodiment forming such arc images AI provides, to the effective entrance area, a long rectangular shape whose longitudinal direction (long side direction) is the x direction. In the cases where the conventional reflectors are used, as shown in FIG. 17, the arc images AI are formed such that their longitudinal directions extend radially. In contrast to these cases, in this embodiment, the arc directions (longitudinal directions) of all the arc images AI extend in the x direction. Thereby, this embodiment enables reduction of loss of light as compared with the cases using the conventional reflectors.

Moreover, setting the arc directions of all the arc images AI to the x direction with respect to the long effective entrance area extending in the x direction reduces sensitivity to changes in arc length. For example, when the effective entrance area has a length of 4 in the x direction and the arc image has a length of 2 in the x direction, even if the length of the arc image increases about twice, the loss of light is not increased and therefore luminance is not decreased. That is, even if the arc length is increased with increase of an accumulated light emission time, high light utilization efficiency can be maintained.

Figure 3:
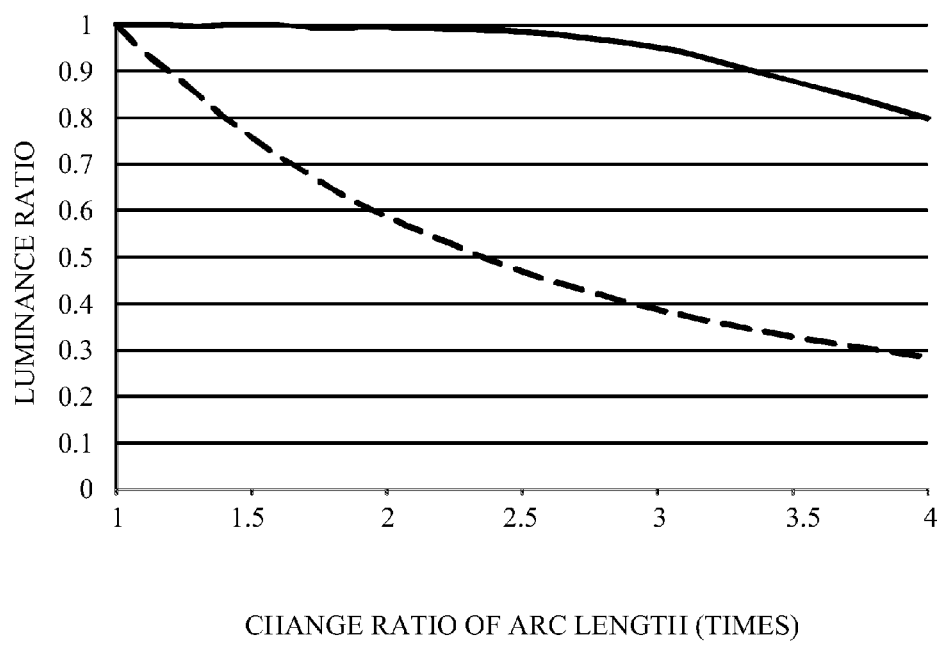
FIG. 3 shows correlations of arc length change and luminance change in the illumination optical system of Embodiment 1 and in a conventional illumination optical system.

FIG. 3 shows changes in luminance of the illumination optical system of this embodiment (shown by a solid line) and a conventional illumination optical system (shown by a dotted line) with respect to changes (increases) in arc length. As understood from FIG. 3, the luminance of the illumination optical system of this embodiment is almost not decreased with respect to a change in arc length halving the luminance of the conventional illumination optical system.

In the illumination optical system of this embodiment using the polarization conversion element 7, an array pitch Px in the x direction and an array pitch Py in the y direction are defined for the arc images AI finally formed behind the polarization conversion element 7 by the light exiting from the polarization conversion element 7 as shown in FIG. 2B. In order to provide the above-mentioned effect, it is necessary that Py/Px, which is a ratio of the array pitches of the finally formed arc images AI, satisfy the following condition:

$$Py/Px \leq 2.0.$$

A higher value of Py/Px than 2 increases the loss of light in the illumination optical system, which makes it impossible to achieve high luminance and long life that are purposes for the illumination optical system.

It is desirable that Py/Px satisfy the following condition:

$$Py/Px \leq 1.6,$$

and it is more desirable that Py/Px satisfy the following condition:

$$Py/Px \leq 1.0.$$

Thus, in this embodiment, the light source and optical elements (the condenser lens system 3, the first fly-eye lens 5 and the second fly-eye lens 6) are configured such that the array pitches Px and Py in the x and y directions of the arc images formed behind the polarization conversion element 7 satisfy the above-mentioned condition.

Although this embodiment does not particularly provide a lower limit of Py/Px, it is desirable that the lower limit be 0.05 (that is, $0.05 \leq Py/Px$), and it is more desirable that the lower limit be 0.1 (that is, $0.1 \leq Py/Px$). A lower value of Py/Px than such a lower limit increases sensitivity to displacement of the arc image (hereinafter referred to as "arc displacement") in the y direction, which may increase variation in luminance due to displacement of the light source with respect to the illumination optical system.

This embodiment sets Px to 4 that is identical to the lens cell array pitch in the x direction of the second fly-eye lens 6, and sets Py to 1.5 that corresponds to half of the lens cell array pitch in the y direction of the second fly-eye lens 6 (Px:Py=4: 1.5). Therefore, Py/Px is 0.375 in this embodiment, which satisfies the above-mentioned condition.

In a similar configuration to that of this embodiment where the image forming element 10 has an aspect ratio of 16:9 and the ratio of the lens cell array pitches in the x and y directions of the second fly-eye lens 6 is 16:9, Py/Px is 0.281 (Px:Py=16: 4.5), which also satisfies the above-mentioned condition.

In other words, in this embodiment (and in Embodiment 4 described later), when the lens cell array pitch in the first direction of the second fly-eye lens 6 is represented by F1 (=Fx) and the lens cell array pitch in the second direction is represented by F2 (=Fy), the following relationship is established:

$$F1 > F2.$$

Moreover, in this embodiment in which the polarization conversion element 7 including the polarization beam splitters one-dimensionally arranged in the second direction with an array pitch of F2/2 is used and the arc images are formed behind the polarization conversion element 7 with an array pitch P1 in the first direction and an array pitch P2 in the second direction, the following relationships are established:

$$P1 = F1 \text{ (that is, } Px = Fx\text{)}$$

$$P2 = F2/2 \text{ (that is, } Py = Fy/2\text{)},$$

and the following condition is satisfied:

$$P2/P1 \leq 2.0$$

In this embodiment, it is desirable to satisfy the following condition:

$$1.3 \leq P2/P1 \leq 1.7.$$

[Embodiment 2]

Figure 4A:
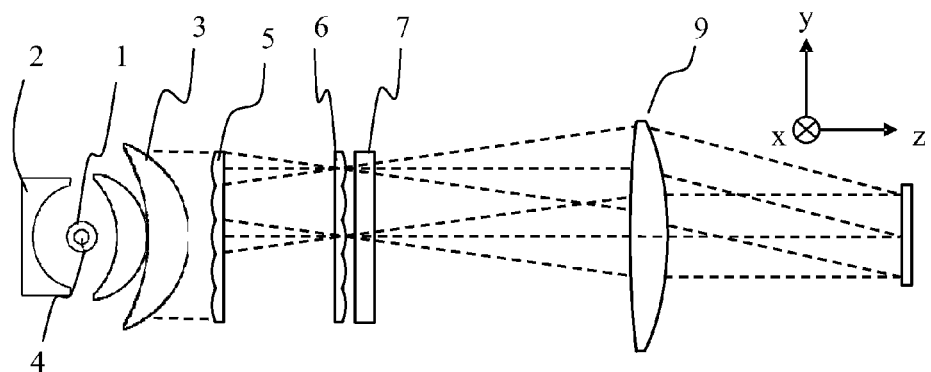
FIGS. 4A and 4B are respectively a y-z sectional view and an x-z sectional view showing a configuration of an illumination optical system that is Embodiment 2 of the present invention.
Figure 4B:
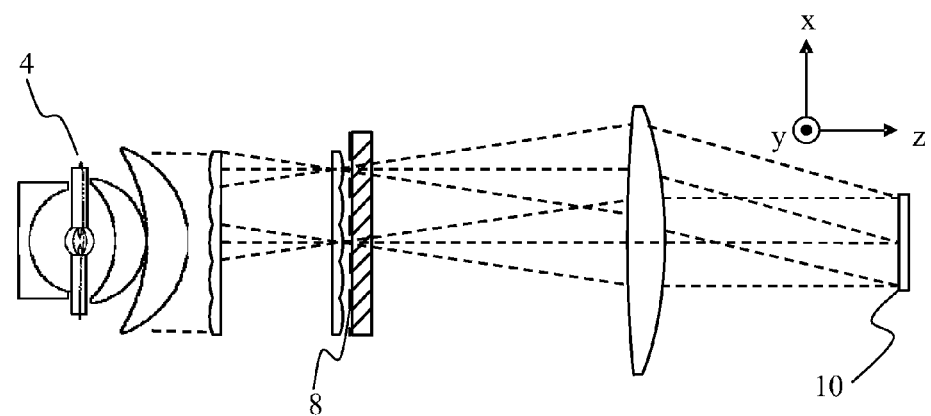
Figure 5A:
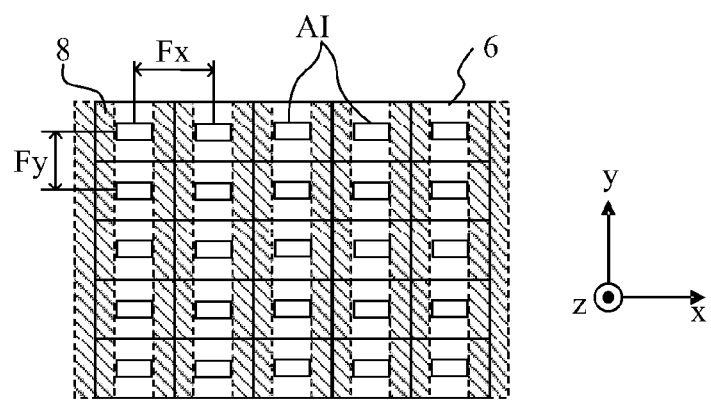
FIGS. 5A and 5B respectively show arc images formed near a second fly-eye lens and arc images formed behind a polarization conversion element in the illumination optical system of Embodiment 2.
Figure 5B:
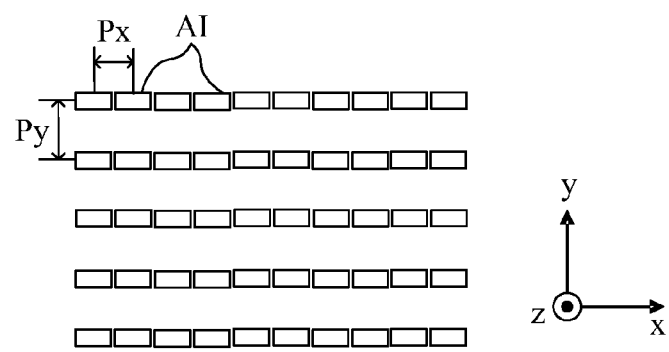

FIGS. 4A and 4B show an optical configuration of an illumination optical system that is a second embodiment (Embodiment 2) of the present invention. FIG. 4A is a y-z sectional view of the illumination optical system, and FIG. 4B is an x-z sectional view thereof. This embodiment has a same basic configuration as that of Embodiment 1, but is different from Embodiment 1 in that the polarization beam splitters and the light blocking members 8 in the polarization conversion element 7 are arranged in the x direction. Therefore, the effective entrance area of the polarization conversion element 7 and the arc images AI have a relationship shown in FIGS. 5A and 5B. In this embodiment, an allowance for changes in arc length in the arc direction (x direction) is smaller than that in Embodiment 1, but an allowance for changes in arc length in the y direction orthogonal to the arc direction is larger than that in Embodiment 1, and therefore sensitivity to arc displacement in the y direction is reduced, which can suppress variation in luminance with the arc displacement.

In this embodiment, when the ratio of the lens cell array pitches in the x and y directions of the second fly-eye lens 6 is 4:3, Py/Px is 1.5, which satisfies the condition described in Embodiment 1. When the ratio of the lens cell array pitches in the x and y directions of the second fly-eye lens 6 is 16:9, Py/Px is 1.125, which also satisfies the condition described in Embodiment 1.

In other words, in this embodiment (and Embodiment 5 described later), when the lens cell array pitch in the first direction of the second fly-eye lens 6 is represented by F1 (=Fx) and the lens cell array pitch in the second direction thereof is represented by F2 (=Fy), the following relationship is established:

$$F1 > F2.$$

Moreover, in this embodiment in which the polarization conversion element 7 including the polarization beam splitters one-dimensionally arrayed in the first direction with an array pitch of F1/2 is used and the arc images are formed behind the polarization conversion element 7 with an array pitch P1 in the first direction and an array pitch P2 in the second direction, the following relationships are established:

$$P1 = F1/2 \text{ (that is, } Px = Fx/2\text{)}$$

$$P2 = F2 \text{ (that is, } Py = Fy\text{)},$$

and the following condition is satisfied:

$$P2/P1 \leq 2.0$$

Also in this embodiment, it is desirable to satisfy the following condition:

$$1.3 \leq P2/P1 \leq 1.7.$$

[Embodiment 3]

Figure 6A:
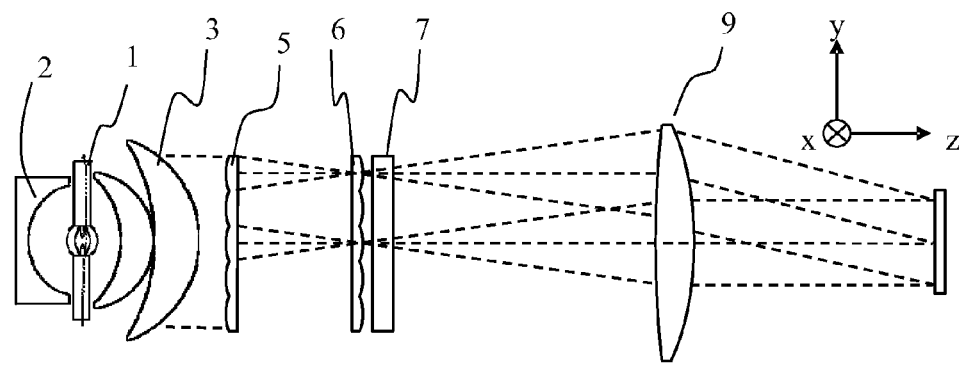
FIGS. 6A and 6B are respectively a y-z sectional view and an x-z sectional view showing a configuration of an illumination optical system that is Embodiment 3 of the present invention.
Figure 6B:
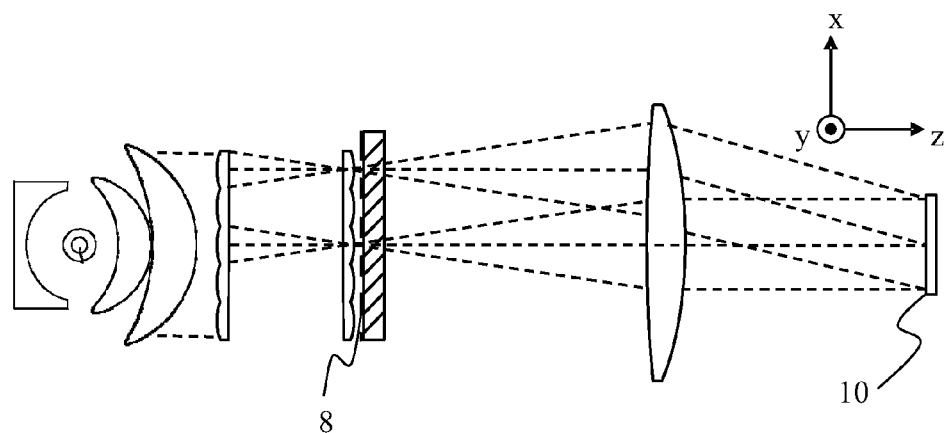

FIGS. 6A and 6B show an optical configuration of an illumination optical system that is a third embodiment (Embodiment 3) of the present invention. FIG. 6A is a y-z sectional view of the illumination optical system, and FIG. 6B is an x-z sectional view thereof. This embodiment has a same basic configuration as that of Embodiment 2, but is different from Embodiment 2 in orientation of the lamp 1. The lamp 1 in this embodiment is disposed such that its arc direction is the y-direction, and therefore the arc is formed along the y-direction. That is, the lamp 1 has an infinite longitudinal length in the y direction as a first direction and forms the arc extending in the y direction. The y direction corresponds to a direction in which a short side of the image forming element 10 and short sides of the lens cells of the first and second fly-eye lenses 5 and 6 extend.

Figure 7A:
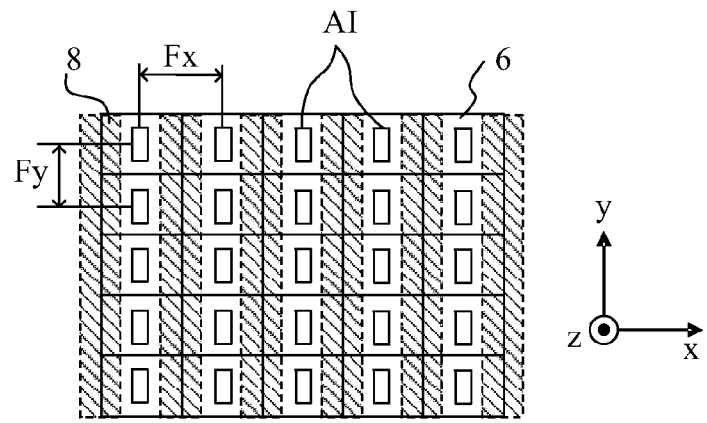
FIGS. 7A and 7B respectively show arc images formed near a second fly-eye lens and arc images formed behind a polarization conversion element in the illumination optical system of Embodiment 3.
Figure 7B:
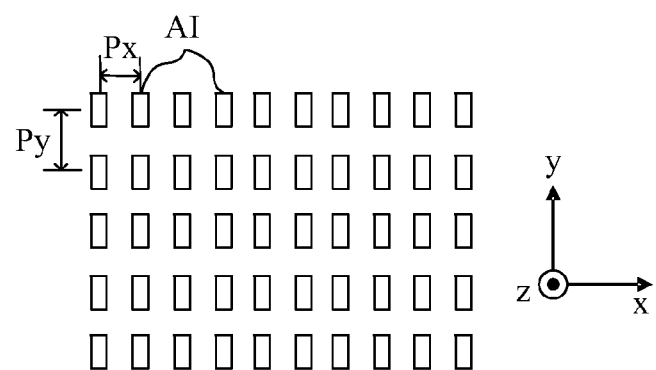

The effective entrance area of the polarization conversion element 7 and the arc images AI in this embodiment have a relationship shown in FIGS. 7A and 7B. In this embodiment, an allowance for changes in arc length in the arc direction (y direction) is smaller than that in Embodiment 1, but larger than that in Embodiment 2. On the other hand, an allowance for changes in arc length in the x direction orthogonal to the arc direction is smaller than that in Embodiment 2, but larger than that in Embodiment 1. Thus, this embodiment enables provision of a balanced allowance for both the changes in arc length and the arc displacement, which can suppress luminance variation and achieve long life.

In this embodiment, when the ratio of the lens cell array pitches in the x and y directions of the second fly-eye lens 6 is 4:3, Py/Px is 0.67, which satisfies the condition described in Embodiment 1. When the ratio of the lens cell array pitches in the x and y directions of the second fly-eye lens 6 is 16:9, Py/Px is 0.89, which also satisfies the condition described in Embodiment 1.

In other words, in this embodiment, when the lens cell array pitch in the first direction of the second fly-eye lens 6 is represented by F1 (=Fy) and the lens cell array pitch in the second direction thereof is represented by F2 (=Fx), the following relationship is established:

$$F1 < F2.$$

Moreover, in this embodiment in which the polarization conversion element 7 including the polarization beam splitters one-dimensionally arrayed in the second direction with an array pitch of F2/2 is used and the arc images are formed behind the polarization conversion element 7 with an array pitch P1 in the first direction and an array pitch P2 in the second direction, the following relationships are established:

$$P1 = F1 \text{ (that is, } Py = Fy\text{)}$$

$$P2 = F2/2 \text{ (that is, } Px = Fx/2\text{)},$$

and the following condition is satisfied:

$$P2/P1 \leq 2.0$$

Also in this embodiment, it is desirable to satisfy the following condition:

$$1.3 \leq P2/P1 \leq 1.7.$$

[Embodiment 4]

Figure 8A:
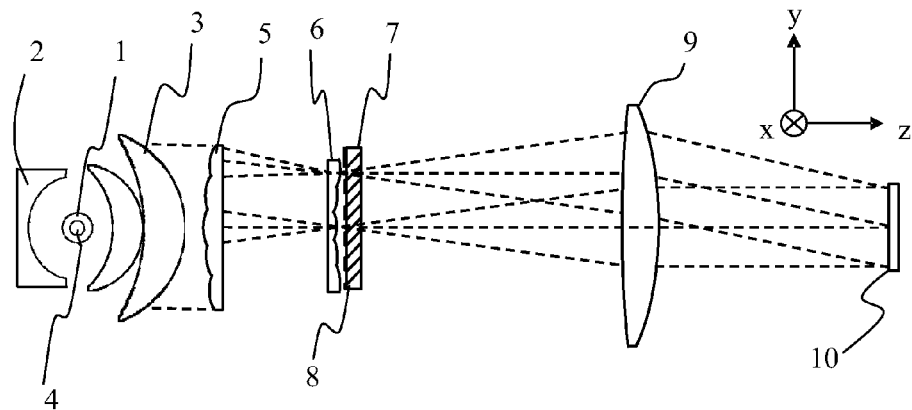
FIGS. 8A and 8B are respectively a y-z sectional view and an x-z sectional view showing a configuration of an illumination optical system that is Embodiment 4 of the present invention.
Figure 8B:
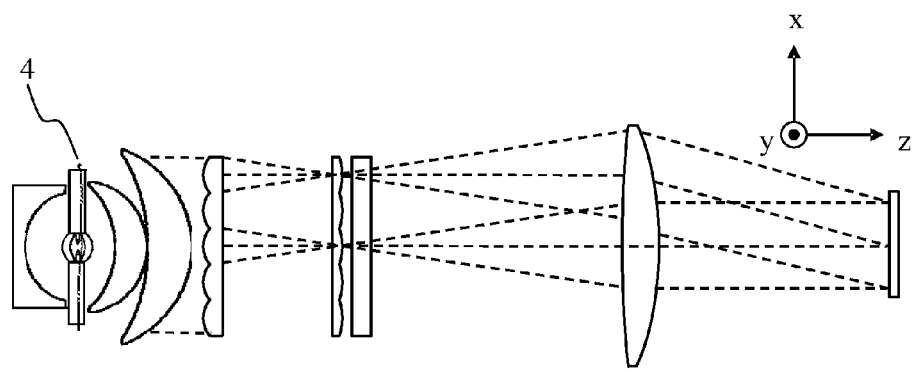
Figure 9A:
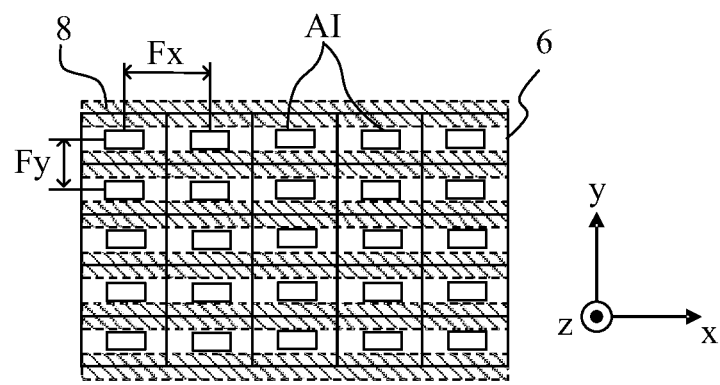
FIGS. 9A and 9B respectively show arc images formed near a second fly-eye lens and arc images formed behind a polarization conversion element in the illumination optical system of Embodiment 4.
Figure 9B:
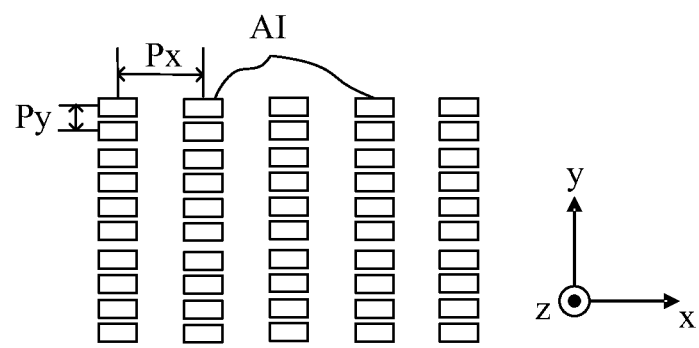

FIGS. 8A and 8B show an optical configuration of an illumination optical system that is a fourth embodiment (Embodiment 4) of the present invention. FIG. 8A is a y-z sectional view of the illumination optical system, and FIG. 8B is an x-z sectional view thereof. This embodiment has a same basic configuration as that of Embodiment 1, but is different from Embodiment 1 in that the first and second fly-eye lenses 5 and 6 are decentered with respect to each other to perform light flux compression. That is, the first and second fly-eye lenses 5 and 6 also serve as a light flux compression optical system. The light flux compression can reduce an F-number of the illumination optical system in its compression section, which enables reduction of color unevenness and miniaturization of the second fly-eye lens 6 and the polarization conversion element 7.

In this embodiment, the light flux compression is performed in the y-z section, and a compression ratio is 0.7. The effective entrance area of the polarization conversion element 7 and the arc images AI in this embodiment have a relationship shown in FIGS. 9A and 9B.

In this embodiment, when the image forming element 10 has an aspect ratio of 4:3, since the light flux compression is performed with the compression ratio of 0.7 in the y direction, the ratio of the lens cell array pitches in the x and y directions of the second fly-eye lens 6 is 4:2.13. In this embodiment, since the polarization beam splitters of the polarization conversion element 7 are arrayed in the y direction, the effective entrance area has a rectangular shape whose ratio of lengths in the x and y directions is 4:1.05.

In this embodiment, since all the arc images have a same arc direction, the light flux compression in a direction orthogonal to the arc direction does not cause loss of light. Therefore, the illumination optical system can be miniaturized without decrease in luminance, which is different from conventional illumination optical systems and which makes it possible to achieve sufficient luminance and miniaturization.

In this embodiment, when the ratio of the lens cell array pitches in the x and y directions of the second fly-eye lens 6 is 4:3, Py/Px is 0.263, which satisfies the condition described in Embodiment 1. When the ratio of the lens cell array pitches in the x and y directions of the second fly-eye lens 6 is 16:9, Py/Px is 0.197, which also satisfies the condition described in Embodiment 1.

[Embodiment 5]

Figure 10A:
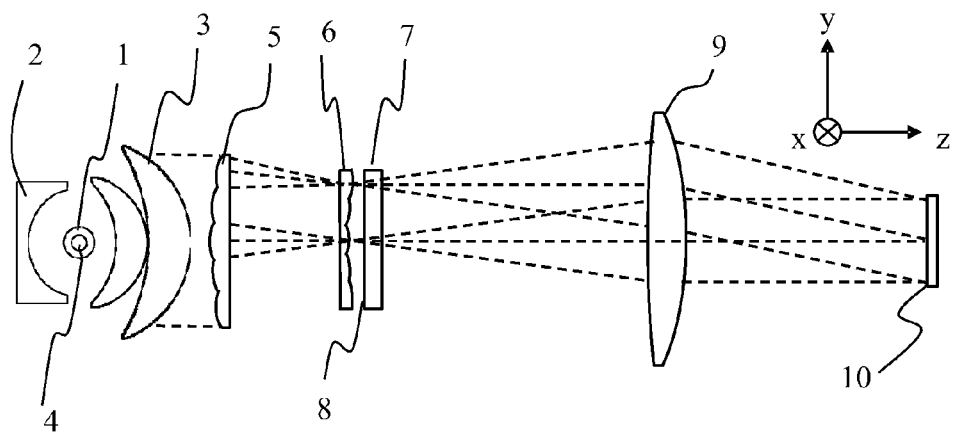
FIGS. 10A and 10B are respectively a y-z sectional view and an x-z sectional view showing a configuration of an illumination optical system that is Embodiment 5 of the present invention.
Figure 10B:
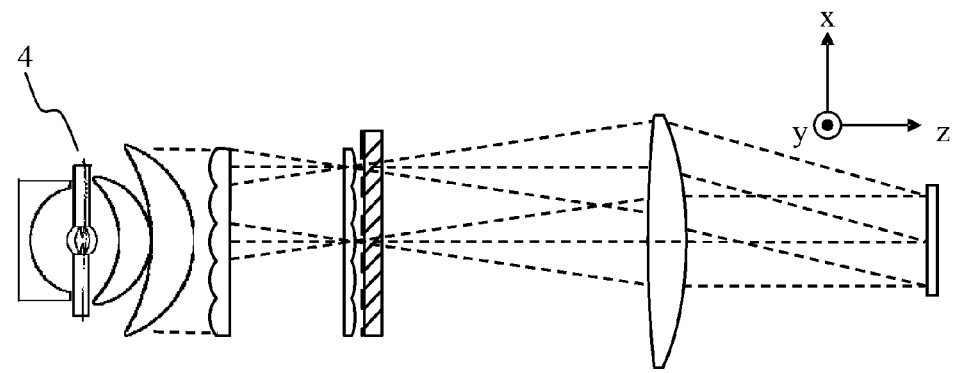
Figure 11A:
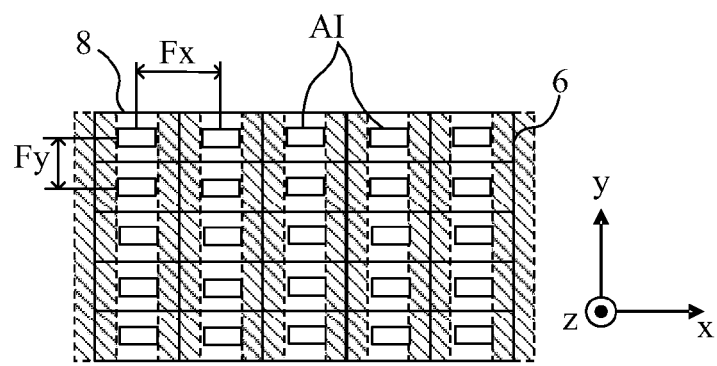
FIGS. 11A and 11B respectively show arc images formed near a second fly-eye lens and arc images formed behind a polarization conversion element in the illumination optical system of Embodiment 5.
Figure 11B:
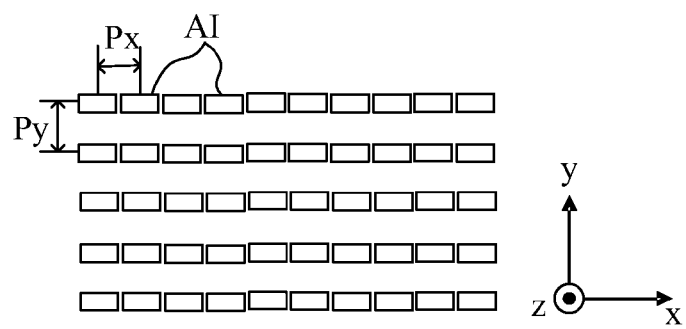

FIGS. 10A and 10B show an optical configuration of an illumination optical system that is a fifth embodiment (Embodiment 5) of the present invention. FIG. 10A is a y-z sectional view of the illumination optical system, and FIG. 10B is an x-z sectional view thereof. This embodiment has a same basic configuration as that of Embodiment 4, but is different from Embodiment 4 in that the polarization beam splitters and the light blocking members 8 in the polarization conversion element 7 are arranged in the x direction. In this embodiment, since an allowance for distance between the arc images in a direction (y direction) orthogonal to the arc direction is larger than in Embodiment 4, the first and second fly-eye lenses 5 and 6 are more largely decentered with respect to each other than in Embodiment 4 and thereby provide a light flux compression ratio of 0.6. The effective entrance area of the polarization conversion element 7 and the arc images AI in this embodiment have a relationship shown in FIGS. 11A and 11B.

When the image forming element 10 has an aspect ratio of 4:3, since the light flux compression is performed with the compression ratio of 0.6 in the y direction, the ratio of the lens cell array pitches in the x and y directions of the second fly-eye lens 6 is 4:1.8. In this embodiment, since the polarization beam splitters of the polarization conversion element 7 are arrayed in the x direction, the effective entrance area has a rectangular shape whose ratio of lengths in the x and y directions is 2:1.8.

In this embodiment, when the ratio of the lens cell array pitches in the x and y directions of the second fly-eye lens 6 is 4:3, Py/Px is 0.9, which satisfies the condition described in Embodiment 1. When the ratio of the lens cell array pitches in the x and y directions of the second fly-eye lens 6 is 16:9, Py/Px is 0.675, which also satisfies the condition described in Embodiment 1.

[Embodiment 6]

Figure 12A:
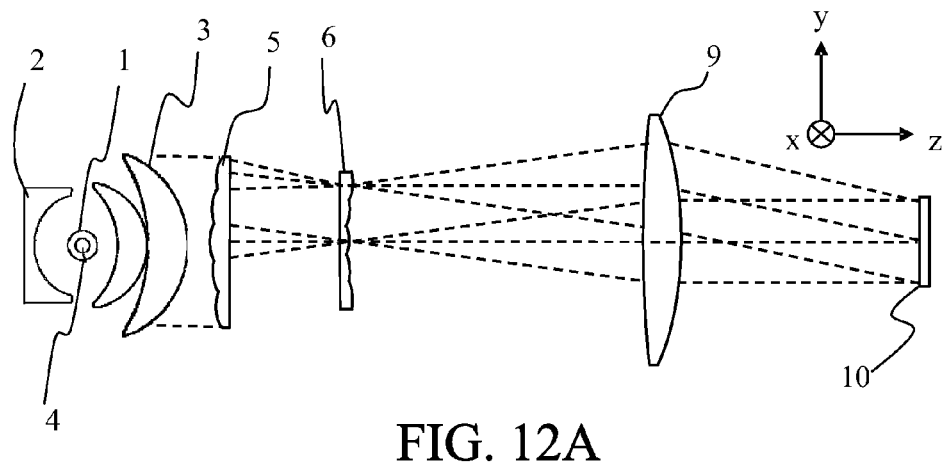
FIGS. 12A and 12B are respectively a y-z sectional view and an x-z sectional view showing a configuration of an illumination optical system that is Embodiment 6 of the present invention.
Figure 12B:
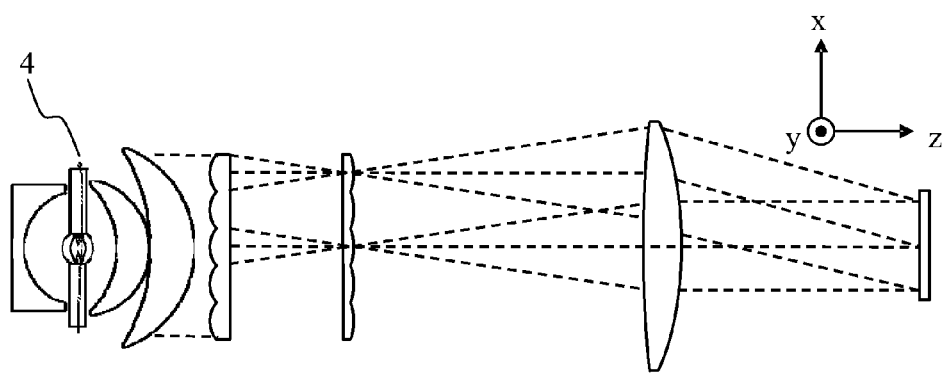

FIGS. 12A and 12B show an optical configuration of an illumination optical system that is a sixth embodiment (Embodiment 6) of the present invention. FIG. 12A is a y-z sectional view of the illumination optical system, and FIG. 12B is an x-z sectional view thereof. This embodiment has a same basic configuration as that of Embodiment 4, but is different from Embodiment 4 in that an element not utilizing polarized light, such as a DMD (digital micromirror device), is used as the image forming element 10. That is, this embodiment does not use the polarization conversion element. This configuration has a large allowance for distance between the arc images in a direction orthogonal the arc direction, so that the first and second fly-eye lenses 5 and 6 are more largely decentered with respect to each other than in Embodiment 4 and thereby provide a light flux compression ratio of 0.6. The effective entrance area of the second fly-eye lens 6 and the arc images AI in this embodiment have a relationship shown in FIG. 13.

Figure 13:
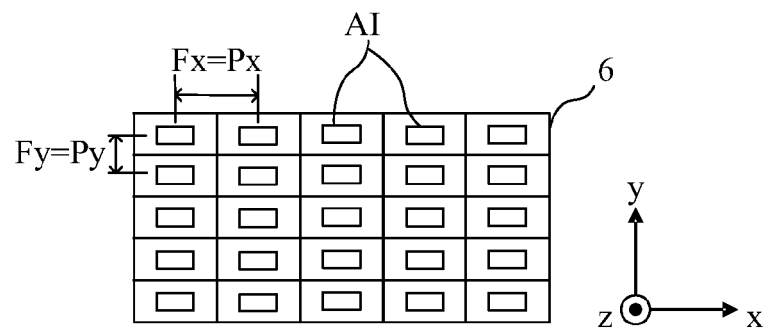
FIG. 13 shows arc images formed near a second fly-eye lens in the illumination optical system of Embodiment 6.

When the image forming element 10 has an aspect ratio of 4:3, since the light flux compression is performed with the compression ratio of 0.6 in the y direction, the ratio of the lens cell array pitches in the x and y directions of the second fly-eye lens 6 is 4:1.8. Since this embodiment uses no polarization conversion element, the number of the arc images is not increased by the optical path dividing function thereof. Thus, this embodiment defines as shown in FIG. 13, array pitches in the x and y directions of the arc images formed near and behind the second fly-eye lens 6 as Px and Py, respectively.

In this embodiment, when the ratio of the lens cell array pitches in the x and y directions of the second fly-eye lens 6 is 4:3, Py/Px is 0.45, which satisfies the condition described in Embodiment 1. When the ratio of the lens cell array pitches in the x and y directions of the second fly-eye lens 6 is 16:9, Py/Px is 0.338, which also satisfies the condition described in Embodiment 1.

In other words, in this embodiment, when the lens cell array pitch in the first direction of the second fly-eye lens 6 is represented by F1 and the lens cell array pitch in the second direction thereof is represented by F2, an array pitch P1 in the first direction of the arc images and an array pitch P2 in the second direction thereof have the following relationship:

$$P1 = F1$$

$$P2 = F2,$$

and the following condition is satisfied:

$$P2/P1 \leq 2.0$$

Also in this embodiment, it is desirable to satisfy the following condition:

$$1.3 \leq P2/P1 \leq 1.7.$$

[Embodiment 7]

Figure 14:
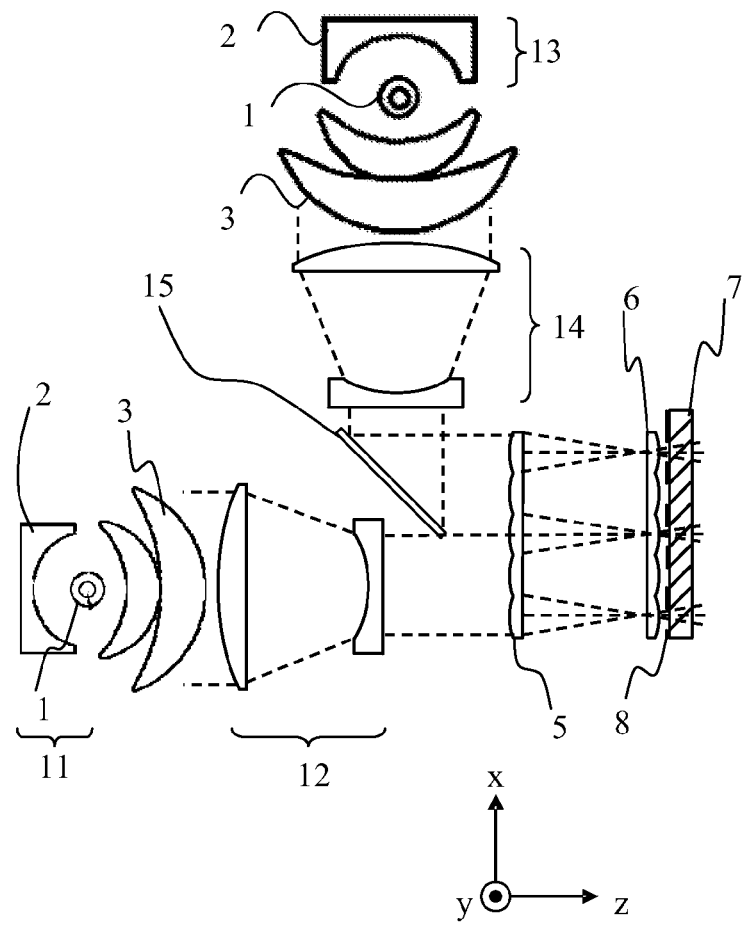
FIG. 14 is a sectional view showing a configuration of an illumination optical system that is Embodiment 7 of the present invention.

FIG. 14 shows an x-z section of an optical configuration of an illumination optical system that is a seventh embodiment (Embodiment 7) of the present invention. This embodiment uses two light sources 11 and 13 each being constituted by the lamp 1 and the retroreflective mirror 2). In the respective lamps 1, the arc direction is the y direction. Moreover, the condenser lens system 3 is provided for each of the two light sources 11 and 13. The configuration on an illumination surface side further than the polarization conversion element 7 is same as that in each of Embodiments 1 to 5, and is therefore omitted in FIG. 14.

In this embodiment, light compression optical systems 12 and 14 are respectively disposed behind the condenser lens systems 3 provided for the light sources 11 and 13. Each of the light compression optical systems 12 and 14 is an afocal optical system constituted by a convex cylindrical lens and a concave cylindrical lens that have curvature in the x-z section. The light compression optical systems 12 and 14 perform light flux compression in the x-z section (that is, in the second direction).

Light emitted from the light source 13 is reflected by a planar reflective mirror 15 in a same direction as that in which light emitted from the light source 11 travels. As a result, the light from the light source 11 and the light from the light source 13 enter the first fly-eye lens 5 in parallel with each other in the x-z section.

Since conventional light flux compression increases loss of light near the second fly-eye lens 6, even if two light sources are used, luminance only increases to about 1.2 to 1.3 times that in a case where one light source is used.

However, the configuration of this embodiment performs the light flux compression in the x direction orthogonal to the arc direction, and therefore causes almost no loss of light. Thus, the use of the two light sources 11 and 13 makes it possible to provide luminance approximately twice as much as in the case where one light source is used.

[Embodiment 8]

Figure 15:
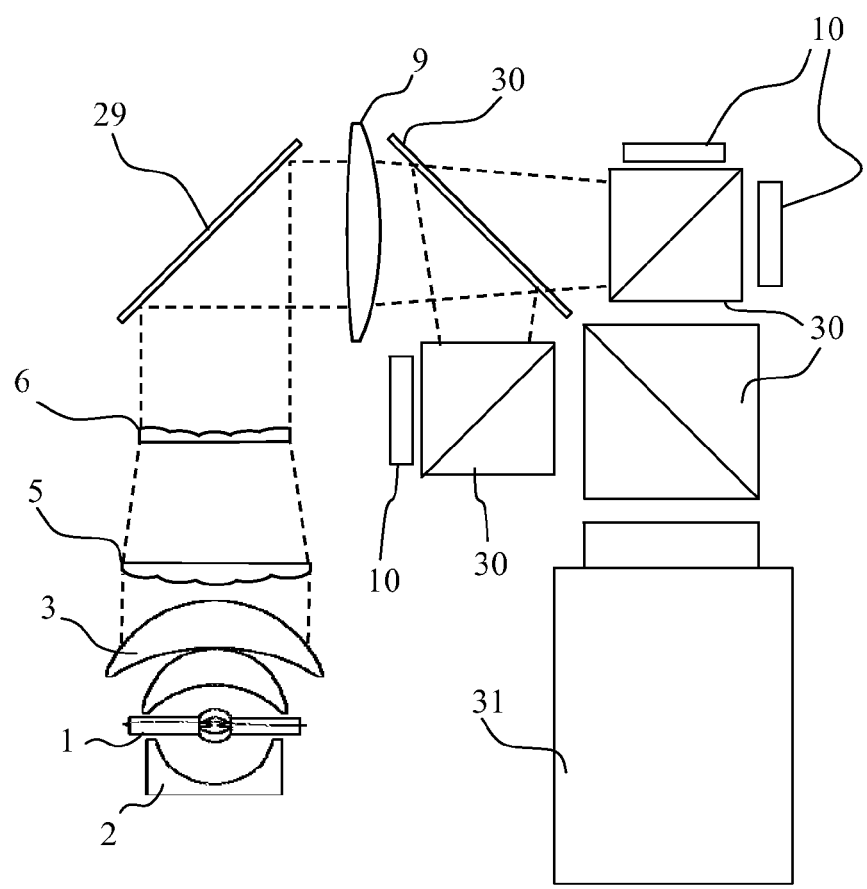
FIG. 15 is a sectional view showing a configuration of a projector that is Embodiment 8 of the present invention.
Figure 16:
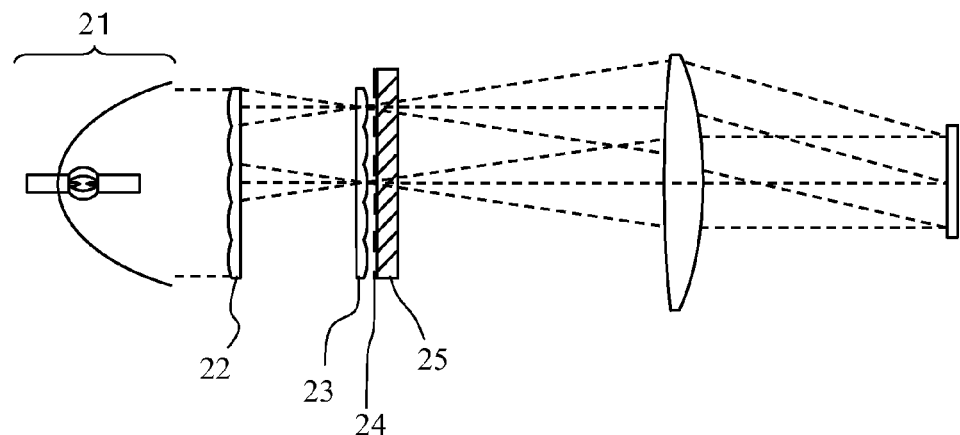
FIG. 16 is a sectional view showing a configuration of a conventional illumination optical system.

FIG. 15 shows an optical configuration of a reflective liquid crystal projector (image projection apparatus) that is eighth embodiment (Embodiment 8) of the present invention, which uses the illumination optical system of any one of Embodiments 1 to 5. Although description will be herein made of the reflective liquid crystal projector, a transmissive liquid crystal projector using the illumination optical system of any one of Embodiments 1 to 5 can be configured, and a projector using the illumination optical system of any one of Embodiments 6 and 7 can be configured. Although not shown in FIG. 15, various optical elements, such as a polarizing plate and a wave plate, other than the optical elements illustrated in FIG. 15 are used in an actual projector.

In FIG. 15, the arc direction of the light source constituted by the lamp 1 and the retroreflective mirror 2 is a direction parallel to the surface of FIG. 15. The light emitted from the light source passes through the condenser lens system 3 and the first and second fly-eye lenses 5 and 6, is reflected by a mirror 29 and then enters the condenser lens 9.

The light passing through the condenser lens is separated by a color separation and combination optical system 30 into lights of three primary colors (RGB). The RGB lights respectively enter three reflective liquid crystal panels as the image forming elements 10, are reflected and image-modulated thereby. Then, the RGB lights are combined with one another by the color separation and combination optical system 30, and projected by a projection lens (projection optical system) 31 onto a projection surface such as a screen (not shown).

An optical axis direction of the projection lens 31 extends parallel to the surface of FIG. 15 and is orthogonal to the arc direction of the light source (lamp 1).

The above-described configuration enables miniaturization of the illumination optical system. Moreover, it is necessary to dispose the lamp 1 as horizontally as possible so as not to generate a temperature difference between the two discharge electrodes of the lamp 1 because the temperature difference decreases light emission efficiency of the lamp 1 and shortens a lifetime thereof. In this regard, this embodiment can dispose the lamp 1 horizontally even when the projector is used with inclination from a horizontal position. Thus, this embodiment can extend the lifetime of the lamp 1.

Although Embodiments 1 to 8 use the discharge arc tube (lamp) as the light source, a light source constituted by LEDs lined up in the first direction or a light source that emits light by exciting a luminescent substance disposed so as to extend in the first direction with laser may be used.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2012-028507, filed on Feb. 13, 2012 which is hereby incorporated by reference herein in its entirety.

What is claimed is:

1. An illumination optical system comprising:
a condenser lens system configured to condense light emitted from a light source;
a first fly-eye lens configured to divide the light from the condenser lens system into a plurality of light fluxes, and cause the light fluxes to form light source images;
a second fly-eye lens configured to transmit the light fluxes from the first fly-eye lens toward an illumination surface to be illuminated; and
a polarization conversion element configured to receive light from the second fly-eye lens and disposed closer to the illumination surface than the second fly-eye lens is,
wherein the light source generates a light emitter having a finite longitudinal length in a first direction orthogonal to an optical axis direction of the illumination optical system,
wherein the first fly-eye lens is configured to form the light source images past the second fly-eye lens toward the illumination surface,
wherein the polarization conversion element includes polarization beam splitters that are one-dimensionally arrayed in a second direction, which is orthogonal to the first direction and an optical axis direction of the illumination optical system, and
wherein the following condition is satisfied:

$$P2/P1 \leq 2.0,$$

where P1 represents an array pitch of the light source images in the first direction, and P2 represents an array pitch of the light source images in the second direction.

2. An illumination optical system according to claim 1, wherein:
the light source includes a discharge arc tube whose paired discharge electrodes face each other in the first direction,
the light emitter is generated in the discharge arc tube, and
the light source images are images of the light emitter generated by discharge between the discharge electrodes.

3. An illumination optical system according to claim 2, further comprising a retroreflective mirror having a toric shape and configured to reflect and return the light from the discharge arc tube toward the light emitter.

4. An illumination optical system according to claim 1, wherein the second fly-eye lens includes lens cells arrayed in the first and second directions, and establishes the following relationships:

$$P1=F1; \text{ and}$$

$$P2=F2,$$

where F1 represents an array pitch of the lens cells in the first direction, and F2 represents an array pitch of the lens cells in the second direction.

5. An illumination optical system according to claim 1, wherein:
the second fly-eye lens includes lens cells arrayed in the first and second directions, and establishes the following relationship:

$$F1>F2,$$

where F1 represents an array pitch of the lens cells in the first direction, and F2 represents an array pitch of the lens cells in the second direction,
wherein an array pitch of the polarization beam splitters is F2/2, and
wherein the following condition is satisfied:

$$P2/P1 \leq 2.0,$$

where P1=F1 and P2=F2/2.

6. An illumination optical system according to claim 1, wherein:
the second fly-eye lens includes lens cells arrayed in the first and second directions, the following condition is satisfied:

$$F1<F2,$$

where F1 represents an array pitch of the lens cells in the first direction, and F2 represents an array pitch of the lens cells in the second direction,
wherein an array pitch of the polarization beam splitters is F2/2, and
wherein the following condition is satisfied:

$$P2/P1 \leq 2.0,$$

where P1=F1 and P2=F2/2.

7. An illumination optical system according to claim 1, further comprising a light flux compression optical system configured to compress the light flux in a cross-section parallel to the optical axis and the second direction.

8. An image projection apparatus comprising:
an illumination optical system configured to introduce light emitted from a light source to an illumination surface to be illuminated;
an image forming element disposed at a position of the illumination surface; and
a projection optical system configured to project the light from the image forming element to a projection surface,
wherein the illumination optical system comprises:
a condenser lens system configured to condense the light emitted from the light source;
a first fly-eye lens configured to divide the light from the condenser lens system into a plurality of light fluxes, and cause the light fluxes to form light source images; and
a second fly-eye lens configured to transmit the light fluxes from the first fly-eye lens toward the illumination surface; and
a polarization conversion element configured to receive light from the second fly-eye lens and disposed closer to the illumination surface than the second fly-eye lens is,
wherein the light source generates a light emitter having a finite longitudinal length in a first direction orthogonal to an optical axis direction of the illumination optical system,
wherein the first fly-eye lens is configured to form the light source images past the second fly-eye lens toward the illumination surface,
wherein the polarization conversion element includes polarization beam splitters that are one-dimensionally arrayed in a second direction, which is orthogonal to the first direction and an optical axis direction of the illumination optical system, and
wherein the following condition is satisfied:

$$P2/P1 \leq 2.0,$$

where P1 represents an array pitch of the light source images in the first direction, and P2 represents an array pitch of the light source images in the second direction.

* * * * *